(12) United States Patent
Falb

(10) Patent No.: US 6,314,650 B1
(45) Date of Patent: Nov. 13, 2001

(54) LASER SYSTEM FOR GENERATING A REFERENCE PLANE

(75) Inventor: David M. Falb, Grand Rapids, MI (US)

(73) Assignee: Laser Alignment, Inc., Grand Rapids, MI (US)

(*) Notice: Subject to any disclaimer, the term of this patent is extended or adjusted under 35 U.S.C. 154(b) by 0 days.

(21) Appl. No.: 09/502,353

(22) Filed: Feb. 11, 2000

Related U.S. Application Data

(60) Provisional application No. 60/119,656, filed on Feb. 11, 1999.

(51) Int. Cl.[7] .................................................. G01C 5/02
(52) U.S. Cl. ........................... 33/286; 33/291; 33/DIG. 21
(58) Field of Search ............................... 33/286, 290, 291, 33/293, 294, 295, DIG. 21

(56) References Cited

U.S. PATENT DOCUMENTS

| | | | |
|---|---|---|---|
| 4,221,483 | 9/1980 | Rando | 356/250 |
| 4,263,973 | 4/1981 | Boulais et al. | 172/4.5 |
| 4,291,982 | 9/1981 | Chin | 356/249 |
| 4,441,812 | 4/1984 | Feist | 356/147 |
| 4,752,126 | 6/1988 | Fujii | 356/140 |
| 4,820,041 | 4/1989 | Davidson et al. | 356/1 |
| 4,830,489 | 5/1989 | Cain et al. | 356/73 |
| 4,854,703 | 8/1989 | Ammann | 356/248 |
| 4,988,192 | 1/1991 | Knittel | 356/138 |
| 5,182,863 * | 2/1993 | Rando | 33/290 |
| 5,331,395 | 7/1994 | Piske et al. | 356/138 |
| 5,361,217 | 11/1994 | Makimura et al. | 364/561 |
| 5,485,266 | 1/1996 | Hirano et al. | 356/249 |
| 5,533,268 | 7/1996 | Keightley | 33/290 |
| 5,551,159 | 9/1996 | Mooty | 33/228 |
| 5,583,685 | 12/1996 | Ohtomo et al. | 359/197 |
| 5,650,949 | 7/1997 | Kishmoto | 364/579 |
| 5,655,307 * | 8/1997 | Ogawa et al. | 33/291 |
| 5,689,330 | 11/1997 | Gerard et al. | 356/138 |
| 5,742,387 | 4/1998 | Ammann | 356/247 |
| 5,784,155 | 7/1998 | Ohtomo et al. | 356/141 |
| 5,790,248 | 8/1998 | Ammann | 356/250 |
| 5,953,108 | 9/1999 | Falb et al. | 356/4.08 |
| 6,087,645 * | 7/2000 | Kitajima et al. | 33/DIG. 21 |
| 6,119,355 * | 9/2000 | Raby | 33/291 |
| 6,138,367 * | 10/2000 | Raby | 33/292 |

OTHER PUBLICATIONS

Ammann Lasertechnik AS–130 brochure, entire document, no date.
Topcon RL–VH2 Series "Smart" Interior Laser brochure, 1997, entire document.
AGL—GradeLight 2000 Hot Pipe Laser brochure, entire document, 12/97.
GEO Feinmechanik GmbH, Automatik—Innenausbau Laser IL–50 brochure, entire document (no date).

* cited by examiner

*Primary Examiner*—G. Bradley Bennett
(74) *Attorney, Agent, or Firm*—VanDyke, Gardner, Linn & Burkhart, LLP

(57) ABSTRACT

A laser system comprising a laser transmitter and a laser receiver is operable to adjust the laser beam or the laser plane generated by the laser transmitter in response to one or more inputs by a user of the system. The system is operable in one or more modes, such that communication from the laser receiver to the laser transmitter results in various adjustments to the laser beam or tilt or slope of the plane generated by the beam. The present invention is preferably operable to automatically account for any drift in the system, or to adjust the slope of the plane generated by the transmitter in response to a detected location of the laser receiver. Additionally, the laser transmitter may be operable to automatically oscillate the beam in a given area in response to detection of the laser receiver in that area. Each of these modes may be actuated via a simple user input at the laser receiver and/or the laser transmitter. The present invention thus provides a simplified process for implementing a laser leveling system, which may be set up and operated by a single user.

48 Claims, 12 Drawing Sheets

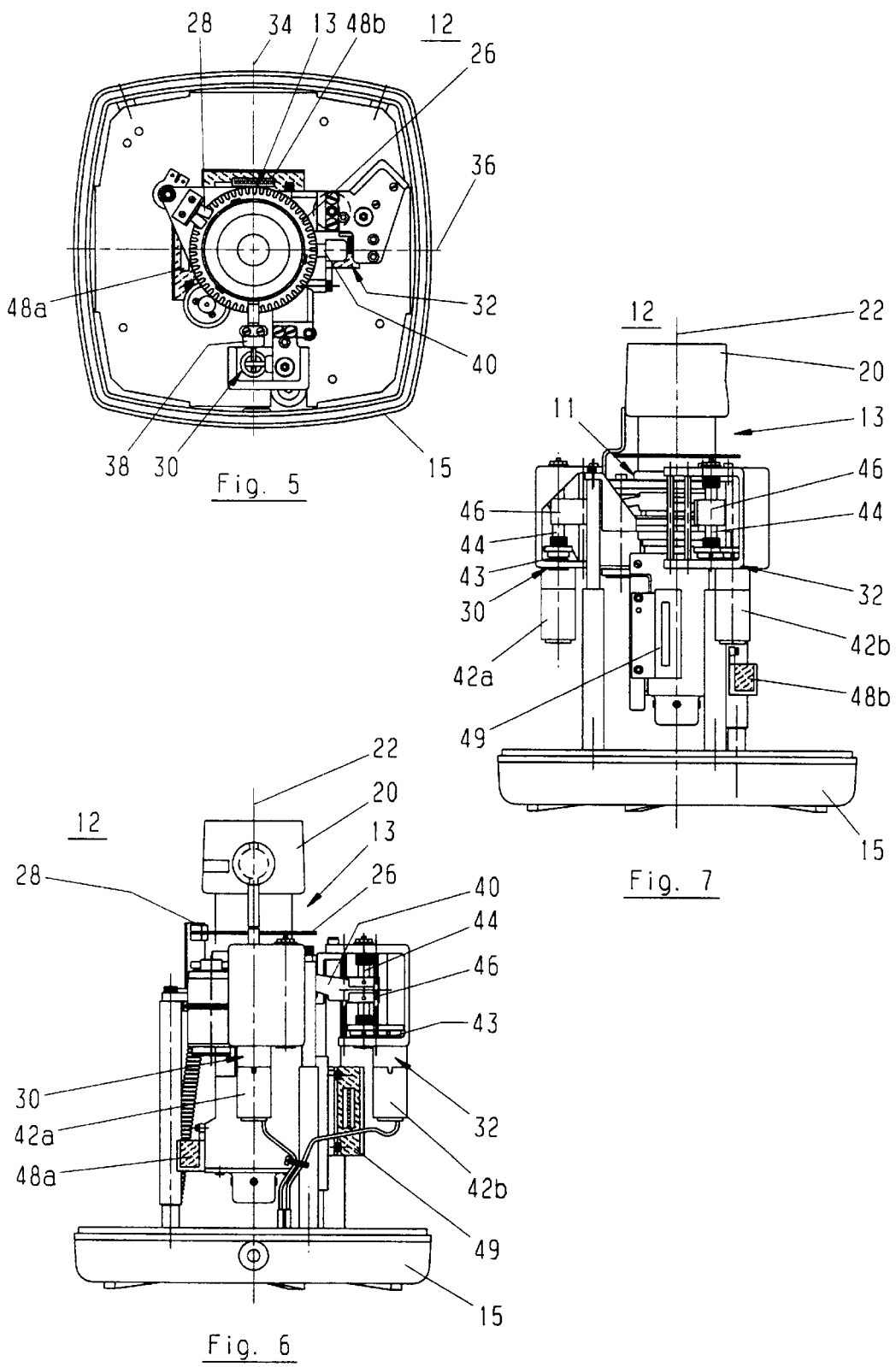

LASER SYSTEM FOR GENERATING A REFERENCE PLANE

This invention claims priority to U.S. provisional Pat. Application Ser. No. 60/119,656, filed Feb. 11, 1999, which is hereby incorporated herein by reference.

BACKGROUND OF THE INVENTION

The present invention relates generally to laser plane generators and, more particularly, to laser plane generators which are operable to selectively adjust a laser plane in response to one or more inputs.

Laser beam projectors and receivers are often used in the construction industry or in agricultural land leveling applications to ensure that the targeted area is graded in the proper or desired slope or grade. The laser beam projector is placed in a known position and one or more sensors are placed in the targeted area to sense the impingement of the laser beam. It is known to have laser beam projectors which are self leveling laser plane generators and which further provide for orientation of a desired grade or slope to the laser beam plane.

A laser plane generator typically includes a laser source for generating a beam of collimated light and a rotating mechanism for rotating the beam of light about an axis to generate a plane of light. In order to provide a substantially level plane, it is necessary to have a known orientation for the laser plane with respect to the true earth reference. Typically, the laser plane is oriented perpendicular to the earth's gravitational field, such as by manually leveling the mechanism or by a self leveling mechanism. Self leveling mechanisms are operable to orient each of a pair of horizontal axes, which are generally orthogonal to one another, in a generally level orientation, via a corresponding pair of servo motors and inclinometer sensors. Additionally, some laser plane generators are operable to orient the laser plane at an angle with respect to the level orientation by rotating each or both of the axes according to the desire slope.

Laser plane generators are often implemented in agricultural land grading applications, where large tracts of land are graded at a very slight grade, in order to facilitate drainage from the tract of land. Such applications require substantially accurate grade requirements over very large regions, and thus require accurate and consistent laser planes to be generated while the work is in progress. However, the laser planes may be bumped or otherwise misaligned over time, or may drift due to changes in temperature. In the large, open areas where these devices are often used, the temperature variations from dawn to dusk may be quite large. Such grade or plane fluctuations may result in improper grading of the tract of land and, thus, lead to additional time and labor to correctly level or grade the targeted land.

Additionally, some grade alignment type laser generators are highly complex units which function to level the system and then rotate the laser source and rotating prism about a vertical and horizontal axis to align the desired grade plane in a proper orientation. This is accomplished by first rotating the laser source and prism about a vertical axis until the horizontal axis is generally perpendicular to a targeted reference point. While such laser projectors facilitate generating a laser plane at a desired grade and orientation, these units and complicated and relatively expensive over non-grade or leveling only units. Additionally, the higher number of moving parts within the units may raise reliability concerns over a prolonged period of time.

Another common usage for laser plane generators is to implement the laser generators for interior use, such as for aligning a wall and/or ceiling within a building. The laser beam is oriented such that the beam is visible on a wall or ceiling as it is rotated, and thus communicates to a worker the proper location or orientation of the wall or ceiling. However, the laser beam is difficult to see with the human eye as it is rapidly rotated and thus intermittently flashed along the surface of the walls or ceilings. In order to enhance visibility of the laser beam, it is known to provide a function on the laser transmitter or generator to oscillate the beam back and forth over a desired location, which results in a more visible laser beam line along the targeted wall or ceiling. However, such a function is set manually at the laser transmitter or requires a special target to be continuously held in the path of the laser beam while the beam oscillates. Such a manual process may be difficult to perform when the laser transmitter is positioned at a ceiling) or upper portion of a wall.

SUMMARY OF THE INVENTION

The present invention is intended to provide a laser leveling system which is operable to adjust a laser beam or laser plane generated by a laser transmitter in response to a signal from a laser receiver. The system is operable to selectively adjust the beam in response to one or more electrical signals selectively transmitted from the laser receiver. The present invention thus provides a system for adjusting the beam of a laser transmitter which may be implemented by a single user of the laser system.

According to one aspect of the present invention, a laser system comprises a laser transmitter and a laser receiver. The laser transmitter is operable to generate a laser plane via rotational projection or reflection of a laser beam. The laser transmitter comprises a signal receiver and a transmitter control. The laser receiver comprises at least one laser sensor which is operable to detect the laser beam from the laser transmitter, an electrical signal transmitter and a receiver control. The laser receiver is operable to selectively transmit at least one electrical signal to the laser transmitter in response to the laser sensor. The laser transmitter is then operable to selectably adjust the laser beam in response to the electrical signal.

In one form, the laser transmitter is operable to adjust the tilt or orientation of the laser beam plane in response to a signal from the laser receiver which indicates that the laser beam received at the receiver is above, below or at a center region of the laser sensor. The laser transmitter is correspondingly operable to lower, raise or maintain the laser beam plane in response to the signal, thereby correcting for any drift or change in the plane as detected by the laser receiver. Additionally, the laser receiver may be raised or lowered a predetermined amount, such that the laser transmitter adjusts the laser beam or plane to accommodate the raised or lowered location of the laser receiver. This results in the laser transmitter being adjustable to a desired grade or slope via movement of the laser receiver in an upwardly or downwardly direction.

In another form, the laser transmitter may be operable to enter an oscillating mode about a point or angle range where the laser beam is received by the laser receiver. The laser receiver is selectively operable to signal the laser transmitter when the laser beam is detected by the laser sensor, such that the laser beam is then oscillated about the initial position of the laser receiver. The laser receiver may then be removed and the transmitter continues to oscillate the beam about that area until selected to do otherwise. This provides improved visibility of the laser beam for applications where the laser beam is to provide a reference point or line for a worker to align a wall or ceiling with. Because the laser receiver may be placed in the precise area where the line is to be received, the present invention provides improved accuracy in locating the laser line and may easily be activated and deactivated by a user.

In yet another form, the transmitter control of the laser transmitter may determine a location of the laser receiver relative to an X and/or Y axis associated with the transmitter and calculate an appropriate slope angle or grade angle for each of the X and Y axes for a desired or input grade in both directions. This provides proper orientation of a desired slope via a single laser receiver and mathematical calculations. The laser transmitter automatically calculates the angle and adjusts the X and Y axes of the transmitter in response to a signal from the laser receiver, such that the slope or grade may be properly oriented by a single user positioning and activating the laser receiver at an appropriate location.

Preferably, the laser leveling system is selectively operable in each of these modes in response to a simple user input at either the laser receiver or the laser transmitter or both.

These and other and objects, advantages purposes and features of this invention will become apparent upon review of the following specification in conjunction with the drawings.

BRIEF DESCRIPTION OF THE DRAWINGS

FIG. 5 is a top plan view of the laser transmitter of FIG. 1, with an outer housing removed;

FIG. 6 is a front elevation of the transmitter of FIG. 5;

FIG. 7 is a side elevation of the transmitter of FIG. 5;

DESCRIPTION OF THE PREFERRED EMBODIMENTS

Figure 1:
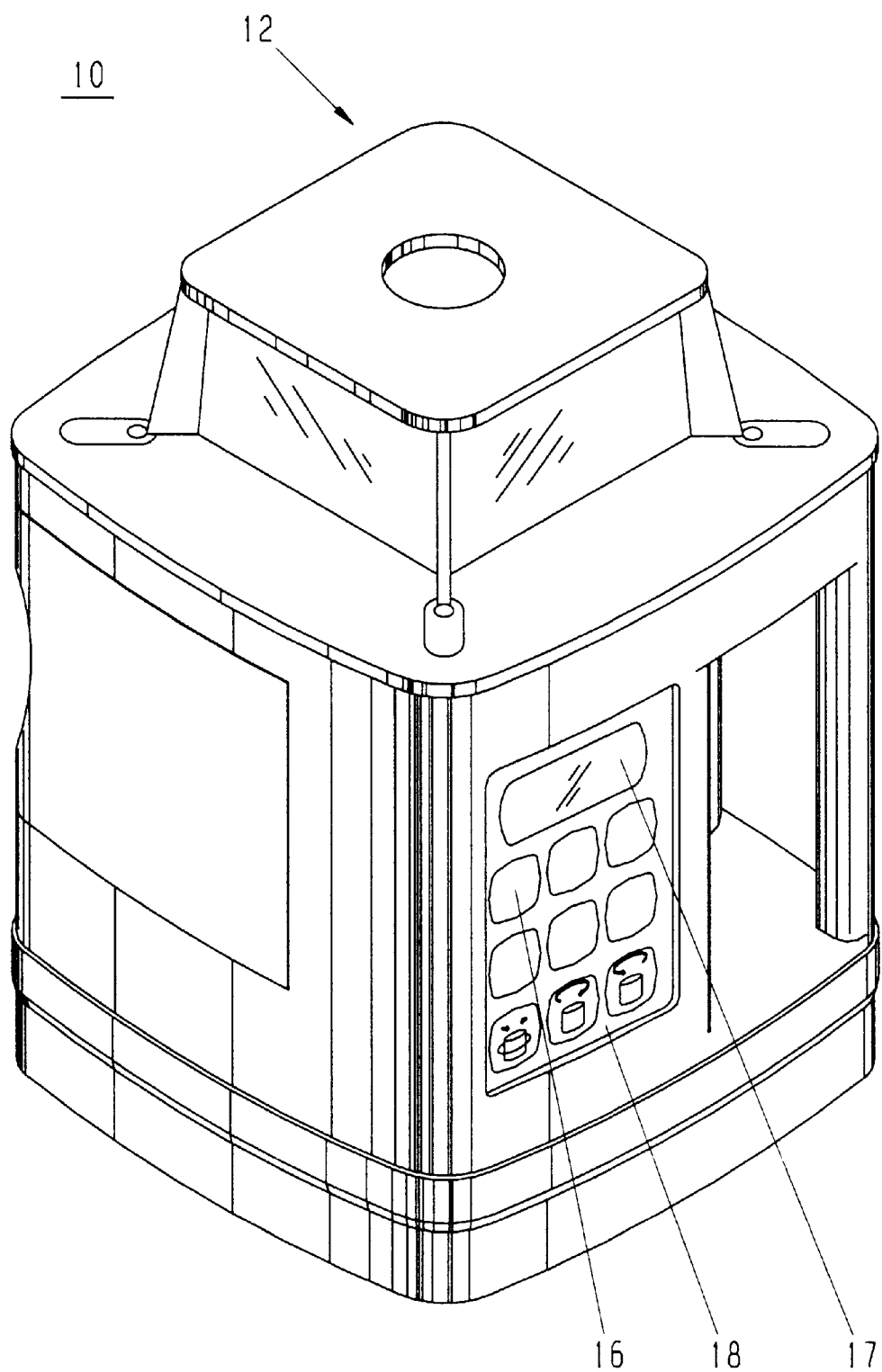
FIG. 1 is a perspective view of a laser transmitter in accordance with the present invention.
Figure 2:
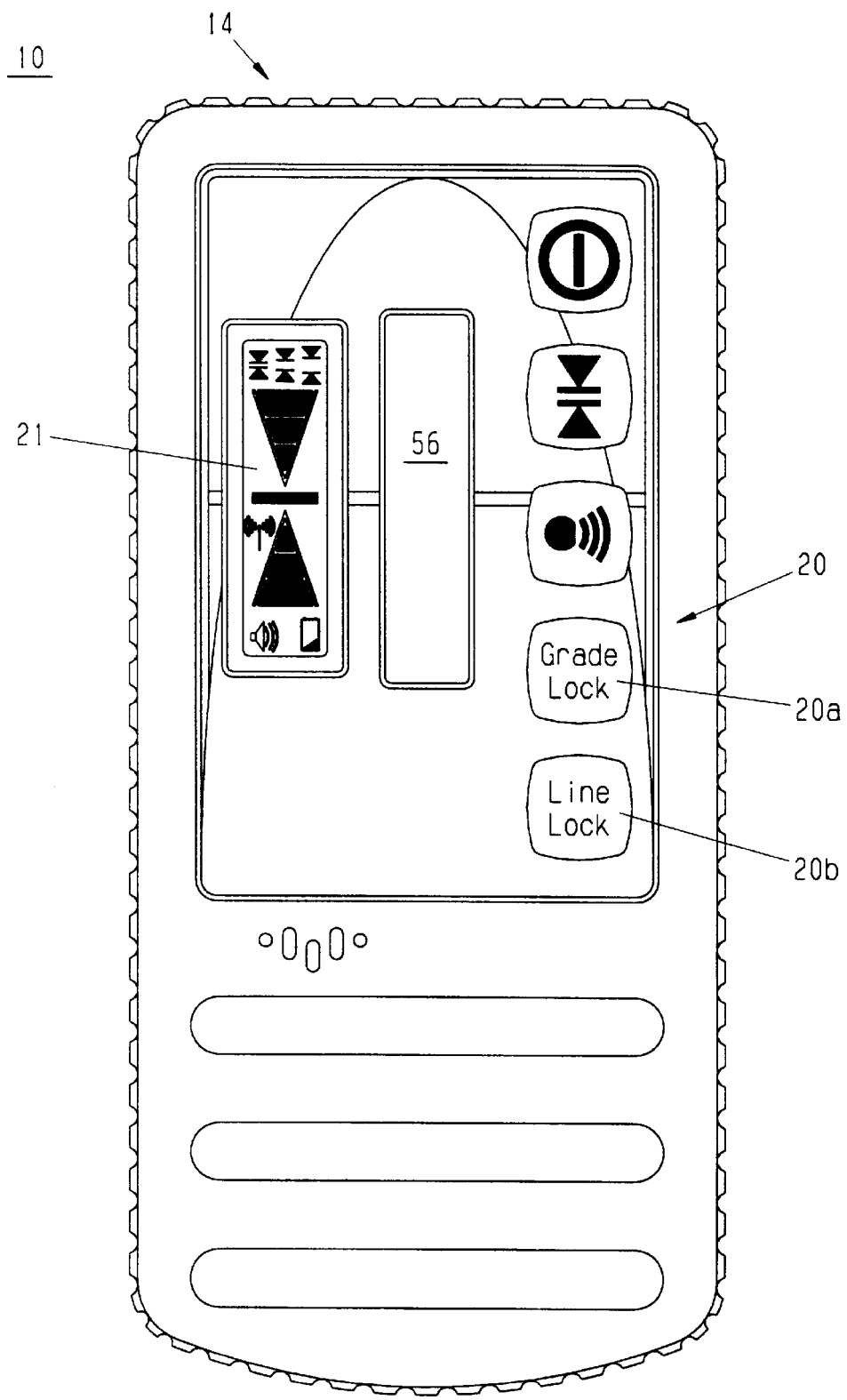
FIG. 2 is a plan view of a laser receiver in accordance with the present invention.
Figure 8:
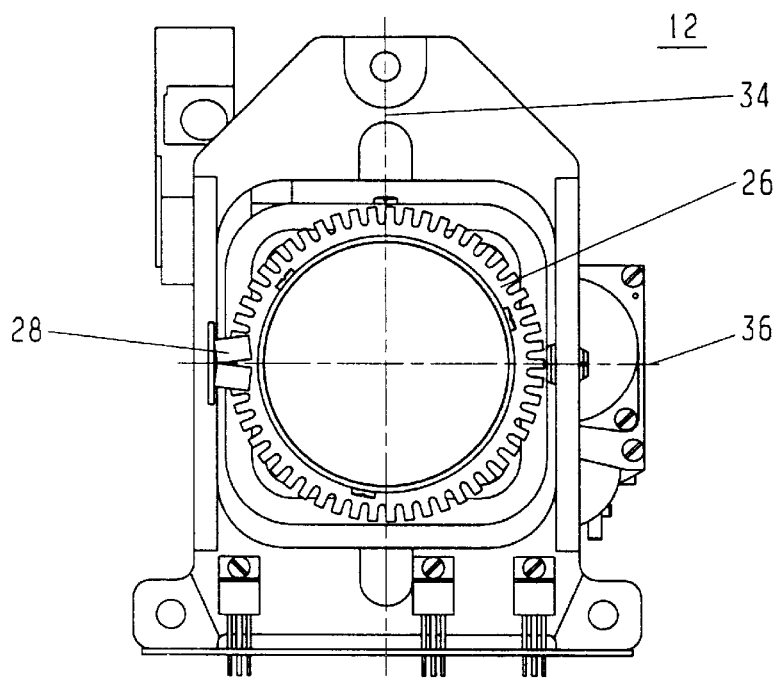
FIG. 8 is a top plan view of a grade laser transmitter useful with the present invention, with an outer housing removed.
Figure 9:
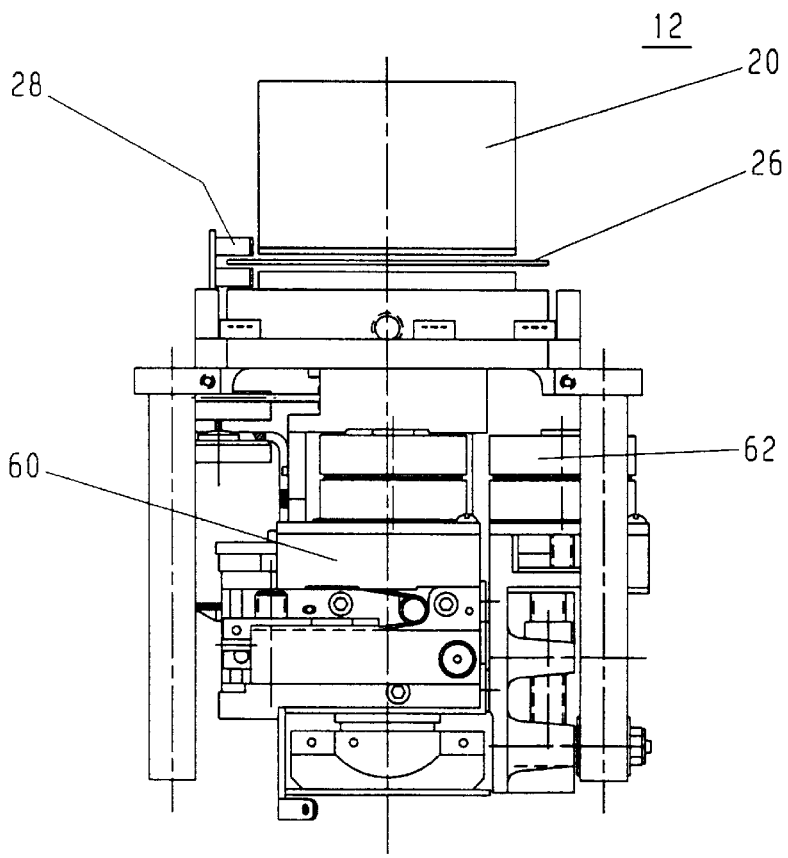
FIG. 9 is a front elevation of the transmitter of FIG. 8.

Referring now specifically to the drawings, and the illustrative embodiments depicted therein, a laser leveling system 10 comprises a laser transmitter 12 (FIG. 1) and a laser receiver 14 (FIG. 2). The laser transmitter 12 is operable to rotate a prism or the like about a vertical axis to project or reflect a laser beam in a plane, as is known in the art. The laser transmitter may be a leveling only or a non-grade laser transmitter, as shown in FIGS. 5–7, or a grade laser transmitter, as shown in FIGS. 8–9. Preferably, laser receiver 14 comprises a small, portable unit which may be easily hand held and carried or which may be easily mounted at a stake or tripod for mounting the receiver in a substantially fixed position. Laser receiver 14 receives or detects a laser beam from the laser transmitter and selectively transmits a signal to laser transmitter 12 in response to receiving the beam. Laser transmitter 12 is operable to adjust the laser or plane orientation of the laser in response to a mode selection and the signal from the laser receiver. Preferably, the mode selection may be input to laser transmitter 12 via one or more buttons 16 at a control panel 18 of laser transmitter 12. A signal selection for laser receiver 14 may also be made via control buttons 20 on laser receiver 14.

Figure 3:
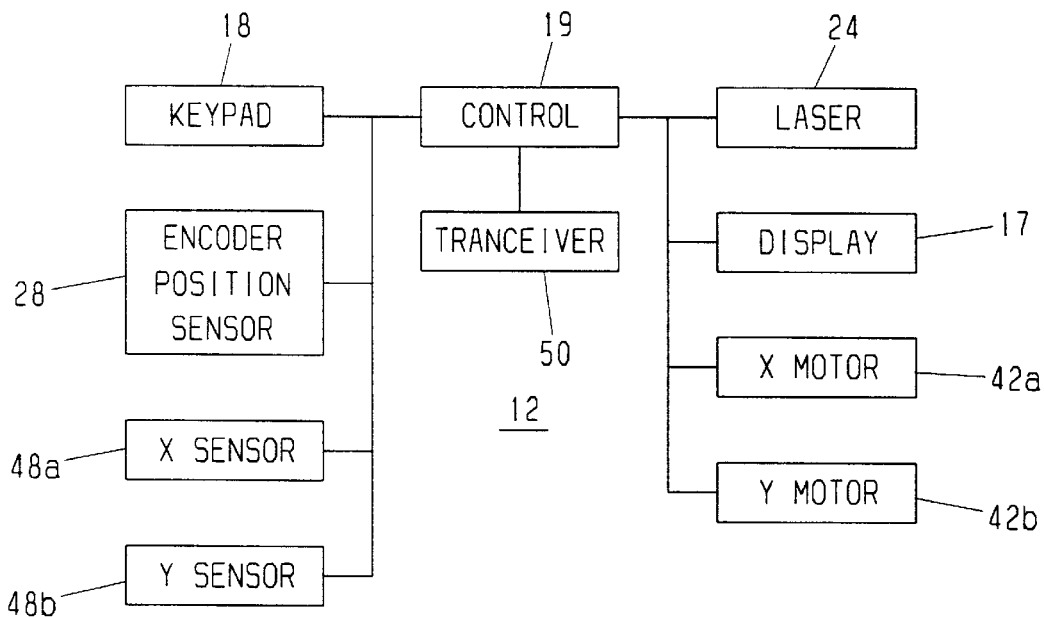
FIG. 3 is a block diagram of the laser transmitter of FIG. 1.

As shown in FIG. 3, laser transmitter 12 comprises a microprocessor or control 19, which is operable to activate a laser source 24, an X-axis motor 42a and/or a Y-axis motor 42b in response to one or more inputs. Control panel or keypad 18 is operable to input a desired mode of operation to control 19, as discussed in detail below. Laser transmitter 12 further comprises a signal receiver or transceiver 50, which is operable to receive an electrical signal, such as a radio frequency (RF) signal or the like, from laser receiver 14. Control 19 is further operable to adjust the X-axis or Y-axis motors 42a and 42b in response to an X-axis level sensor 48a, a Y-axis sensor 48b, keypad 18, and/or a signal from laser receiver 14 received via transceiver 50. Control 19 also receives a signal from an encoder position sensor 28 and is operable to determine the rotational orientation of the laser beam, as discussed below, and may rotate the laser beam to a desired orientation in response to such signals. Laser transmitter 12 may further comprise a display 17, which is operable to display a status message of laser transmitter 12 via control 19. The display 17 may convey the mode of operation of laser system 10, in response to an input at keypad 18.

Figure 4:
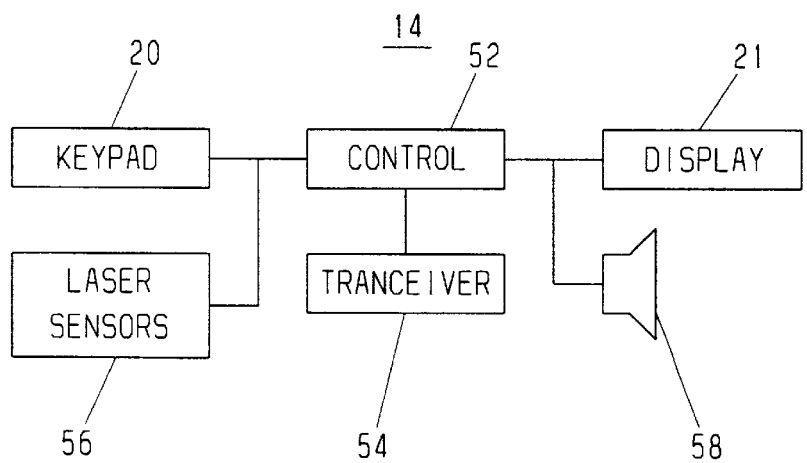
FIG. 4 is a block diagram of the laser receiver of FIG. 2.

Referring now to FIG. 4, laser receiver 14 preferably comprises a microprocessor or control 52, which is operable to send or receive an electrical signal, such as a RF signal or the like, via a transmitter or transceiver 54, in response to one or more laser sensors 56 and a user input via keypad 20. Laser sensors 56 are operable to detect the presence of a laser beam at laser receiver 14. Laser receiver 14 may further comprise a display 21 which is operable to display a status message or input selection of laser receiver 14 via control 52, and an audio device 58, which is operable to generate an audible tone in response to one or more inputs or completion of a selected function, as discussed below. The display 21 is preferably further operable to display a transmission message or the like when laser receiver 14 transmits the electrical signal.

Preferably, the signal communicated between transceiver 50 on laser transmitter 12 and transceiver 54 on laser receiver 14 is an electrical signal, such as a radio frequency or RF signal or the like, and thus provides substantially instantaneous communication between laser transmitter 12 and laser receiver 14. The RF signals further avoid potential interference due to an object being positioned between laser transmitter 12 and laser receiver 14, such that the communication between the units does not require a clear line of sight. The signal or signals may be transmitted at any frequency and may be at any GigaHertz, MegaHertz, KiloHertz, or Hertz frequency ranges. In the illustrated embodiments, the selected frequency for the RF signal is an on/off keyed (OOK) signal transmitted at 433.92 MHz or 418 MHz. Other formats, such as spread spectrum, frequency modulation or the like, may also be used, without affecting the scope of the present invention. Signal transceiver or transmitter 54 of laser receiver 14 is preferably a commercially available RF signal transmitter, available from RF Monolithics of Dallas, Tex.

Preferably, the RF signal is transmitted as a pulse or modulation signal, such as an on/off keyed signal (which transmits a sine wave at a frequency such that the signal is turned on and off at a rapid rate). However, the signal may be any other form of data stream, such as an amplitude modulation signal, a frequency modulation signal, a spread spectrum signal, or the like, without affecting the scope of the present invention. If the signal or signals are transmitted as an on/off keyed signal, then the signal receiver 50 of laser transmitter 12 is operable to detect a presence or absence of the signal. If laser receiver is operable to transmit multiple signals, in order to convey different information or data to laser transmitter 12, control 19 may be operable to determine what information is being transmitted in response to the mode selection and/or the time delay between the pulses. Although described as communicating via an RF signal, it is further envisioned that the laser receiver and laser transmitter may communicate via any other known signals, such as infrared energy or the like, without affecting the scope of the present invention.

Preferably, laser receiver 14 is operable to communicate more than one signal via transceiver 54, each of which will be interpreted by control 19 of laser transmitter 12 as a different command, as discussed below. Although shown as comprising a transceiver 54, which may allow two-way communication between laser receiver 14 and laser transmitter 12, laser receiver 14 may alternately comprise a transmitter only which is operable to transmit a signal to laser transmitter 12, which may also only comprise a signal receiver, such that the laser receiver and laser transmitter are operable via one way communication only. However, it is envisioned that laser receiver 14 and laser transmitter 12 may comprise two-way transceivers in order to allow communication to and from both units. For example, laser transmitter 12 may communicate a confirmation signal to laser receiver 14 when laser transmitter receives a valid signal from laser receiver 14.

As shown in FIGS. 5–7, laser transmitter 12 may be a non-grade laser transmitter, such as an LB9 or LB900 unit which are commercially available from Laser Alignment Inc. of Grand Rapids, Mich. Laser transmitter 12 may also comprise a laser unit of the type disclosed in commonly assigned U.S. Pat. No. 5,689,330, the disclosure of which is hereby incorporated herein by reference. Because such units are known and commercially available, a detailed description will not be included herein. Suffice it to say that laser transmitter 12 comprises microprocessor or control 19 (FIG. 3), a keypad 18 and preferably display 17 (FIGS. 1 and 3) for user interface with control 19. Laser transmitter 12 further comprises a base 15 and a pivotable assembly 13 which is pivotally supported relative to base 15 via a ball and socket joint 11 (FIG. 7). Pivotable assembly 13 further comprises a rotating head 20, which contains a prism (not shown) for reflecting the laser beam outwardly from laser transmitter 12 such that a laser plane is formed as the head 20 is rotated 360° about a vertical axis 22. The laser beam is emitted from a laser source 24 positioned within laser transmitter 12 and generally beneath rotating head 20. Laser transmitter 12 further comprises an encoder ring 26, which rotates with rotating head 20, and position sensor 28, which is operable to detect a rotational position of encoder ring 26, such that the position or orientation of rotating head 20, and thus the direction that the laser beam is reflected or projected, is known and monitored by control 19 of laser transmitter 12. In the illustrated embodiment, encoder ring 26 comprises a plurality of teeth or notches around its circumferential edge. Position sensor 28 is operable to detect the notches as the encoder ring 26 is rotated relative to sensor 28 to determine the exact position of the laser beam at a given time. However, other means for determining the orientation of the laser beam may be implemented without affecting the scope of the present invention. For example, the encoder ring may comprise a single mark or notch or tooth which is detectable by a sensor, such that the exact orientation of the laser beam may be calculated by monitoring the time elapsed since the mark passed position sensor 28 and the rotational speed of the encoder ring. Alternately, the encoder ring, may have a plurality of marks or notches as shown, or may have multiple individual markings, each of which represents a particular orientation of the laser beam with respect to the base 15 of the laser transmitter 12.

The pivotable assembly 13 comprises laser source 24, encoder 26, and rotating head 20, and is pivotally mounted to base 15 at joint 11. Laser transmitter 12 further comprises a pair of leveling mechanisms 30 and 32, which are operable to adjust the orientation of the assembly 13 with respect to a pair of generally orthogonal axes 34 and 36. As is known in the art, each of the leveling mechanisms 30 and 32 preferably comprise a leveling motor 42a, 42b, such as an electronic servo motor or the like, a threaded rotatable member 44, and a correspondingly threaded, vertically movable nut 46, which is connected to a respective arm 38 and 40 of pivotable assembly 13. An output shaft 43 of motors 42a and 42b is interconnected with threaded member 44, such that activation of motor 42a and/or 42b causes corresponding rotation of threaded member 44, which further results in vertical movement of threaded nut 46. Such movement results in a vertical adjustment of one of the axes 34 or 36, such that the laser source 24 and rotating head 20 pivot about the other axis 36 or 34. Leveling mechanisms 30 and 32 each further comprise a level sensor 48a and 48b, respectively, which are operable to detect a tilt or orientation of each axis relative to an earth reference. Preferably, a third level sensor 49 is vertically oriented along the central portion of the laser transmitter 12. The leveling sensors 48a, 48b and 49 are preferably inclinometer sensors which detect movement of conductive fluid in a vial at each sensor, as is known in the art. The leveling motors 42 are operable via control 19 of the laser transmitter 12 which may be further operable in response to one or more level sensors 48a, 48b and/or 49, in order to automatically level the unit such that the laser plane generated by laser transmitter 12 is substantially horizontal with respect to the earth reference. Because each of the leveling motors 42a and 42b may be activated via control 19 of laser transmitter 12, they are preferably operable in response to signals other than a level or non-level signal generated by the electronic leveling sensors 48a, 48b and/or 49. Accordingly, laser transmitter 12 may be adjustable to a desired non-level orientation via control 19 of laser transmitter 12.

Although shown and described above as being a leveling only or non-grade laser transmitter, it is further envisioned that laser transmitter 12 may comprise a grade type laser transmitter, which is operable to adjust the laser plane to a selected grade in both the X and Y directions, such as an LB4 or LB400 unit which are commercially available from laser Alignment Inc. of Grand Rapids, Mich. Other examples of such laser transmitters are known and commercially available from various sources, and disclosed in commonly assigned U.S. Pat. No. 5,953,108, the disclosure of which is hereby incorporated herein by reference. An example of such a device is shown in FIGS. 8 and 9 and comprises a laser source 24, a rotating laser head 20, a rotating encoder ring 26, and a position sensor 28, similar to the non-grade laser transmitter discussed above with respect to FIGS. 5–7. The grade type laser transmitter 12 also comprises X-axis and Y-axis leveling mechanisms (not shown) similar to the mechanisms 30 and 32 discussed above. The grade laser transmitter 12 further comprises an X-axis grade adjusting mechanism 60 and a Y-axis grade adjusting mechanism 62, which are operable to tilt or adjust the leveling sensors (not shown) along the X axis 34 and the Y axis 36, respectively, in response to an input grade to control 19 of transmitter 12, as is known in the art. Actuation of the X or Y mechanism 60 or 62 results in a tilt of one or both of the leveling sensors, such that the leveling mechanisms function to "level" the axes relative to the tilted sensors, thereby orienting or tilting the laser plane in a predetermined grade along one or both axes.

Preferably, laser system 10 is operable in one or more operation modes in response to a mode selection at laser transmitter 12 and a signal received from laser receiver 14. For example, laser system 10 may be operable in a zero-drift or plane adjustment mode, a target detection mode and/or a slope matching mode. If laser transmitter 12 comprises a grade laser transmitter, such as described above with respect to FIGS. 8 and 9, laser system 10 may be operable in each of these modes and/or may be further operable in a grade axis alignment mode.

In the zero-drift or plane adjustment mode, laser system 10 is operable to provide communication from laser receiver 14 to laser transmitter 12 in response to the detected laser beam at laser sensors 56 of laser receiver 14 drifting or otherwise moving upwardly or downwardly from a zero or centered position. Laser transmitter 12, which may be a nongrade laser transmitter or a grade laser transmitter, is then operable to adjust the laser plane in response to such a signal from laser receiver 14, in order to bring the laser beam back toward the center position at the sensor 56 of the particular laser receiver 14. One or more laser receivers 14 may be positioned generally along the X or Y axis of laser transmitter 12 at the targeted area and may communicate with the laser transmitter as the laser beam is received at the laser sensors 56 of the respective laser receiver 14. Because the laser transmitter 12 is operable to determine the precise rotational position of the laser beam via encoder 26 and position sensor 28, control 19 of laser transmitter 12 is further operable to determine the direction that a signal came from, since the signal is received at substantially the same time that the laser beam is directed in that direction. Therefore, control 19 is further operable to determine which of the laser receivers 14 transmitted the signal and the position of the laser receiver relative to laser transmitter 12. In applications where two or more laser transmitters are used in the same area, such as at different levels, it is further envisioned that the laser receivers may transmit different codes. This allows each laser transmitter to communicate with and/or respond to the signal or signals from the appropriate laser receiver or laser receivers only.

Control 19 of laser transmitter 12 is then operable to actuate the X-axis motor 42a and/or the Y-axis motor 42b appropriately in response to the signal, such that the laser plane is re-centered at the respective laser receiver 14. Preferably, control 52 and transceiver 54 of laser receiver 14 are operable to convey multiple messages or signals to laser transmitter 12, such as a "high". "low", or "centered" message to convey to laser transmitter 12 whether the laser beam being received by laser receiver 14 is above, below or at the centered position, respectively. Laser transmitter 12 is then operable to adjust the laser beam downwardly or upwardly, or maintain the present orientation, in response to such signals. Before, during and upon completion of the adjustment, laser receiver 14 may display a position of the laser beam relative to the center of sensors 56 at display 21. Upon completion of the adjustment, laser receiver 14 may provide a confirmation tone or beep via audio device 58, to notify a user that the task has been completed.

Similar to the drift adjust mode, laser system 10 may be operable in a slope matching mode, whereby laser transmitter 12 is operable to adjust or orient the laser plane in a desired slope or grade in response to one or more signals from laser receiver 14. This is accomplished by first placing a laser receiver 14 at a desired location and in the path of an initial laser beam or plane, and then raising or lowering laser receiver 14 a desired amount. As the sensors 56 detect that the laser beam has moved in a particular direction from an initial position, control 52 and transceiver 54 of laser receiver 14 are then operable to transmit a signal in response to a user input which communicates to transmitter control 19 to adjust the laser plane toward the new position of the center region of laser sensors 56 of laser receiver 14. Preferably, laser receiver 14 may be placed a known distance from laser transmitter 12 and then raised or lowered a known amount, such that a desired grade or slope may be adjustably generated by laser transmitter 12 as the beam is adjusted to follow the movement of laser receiver 14. Because laser transmitter 12 is leveled and adjusted via leveling motors 42a and 42b, the motors may be operable to override the X-axis and Y-axis sensors 48a and 48b, and adjust the laser plane to a desired slope. The signals communicated by laser receiver 14 during the slope matching mode are substantially similar to the signals conveyed during the drift adjust mode, and provide commands to laser transmitter 12 to raise or lower the laser plane at that particular point to the new desired orientation.

Figure 10A:
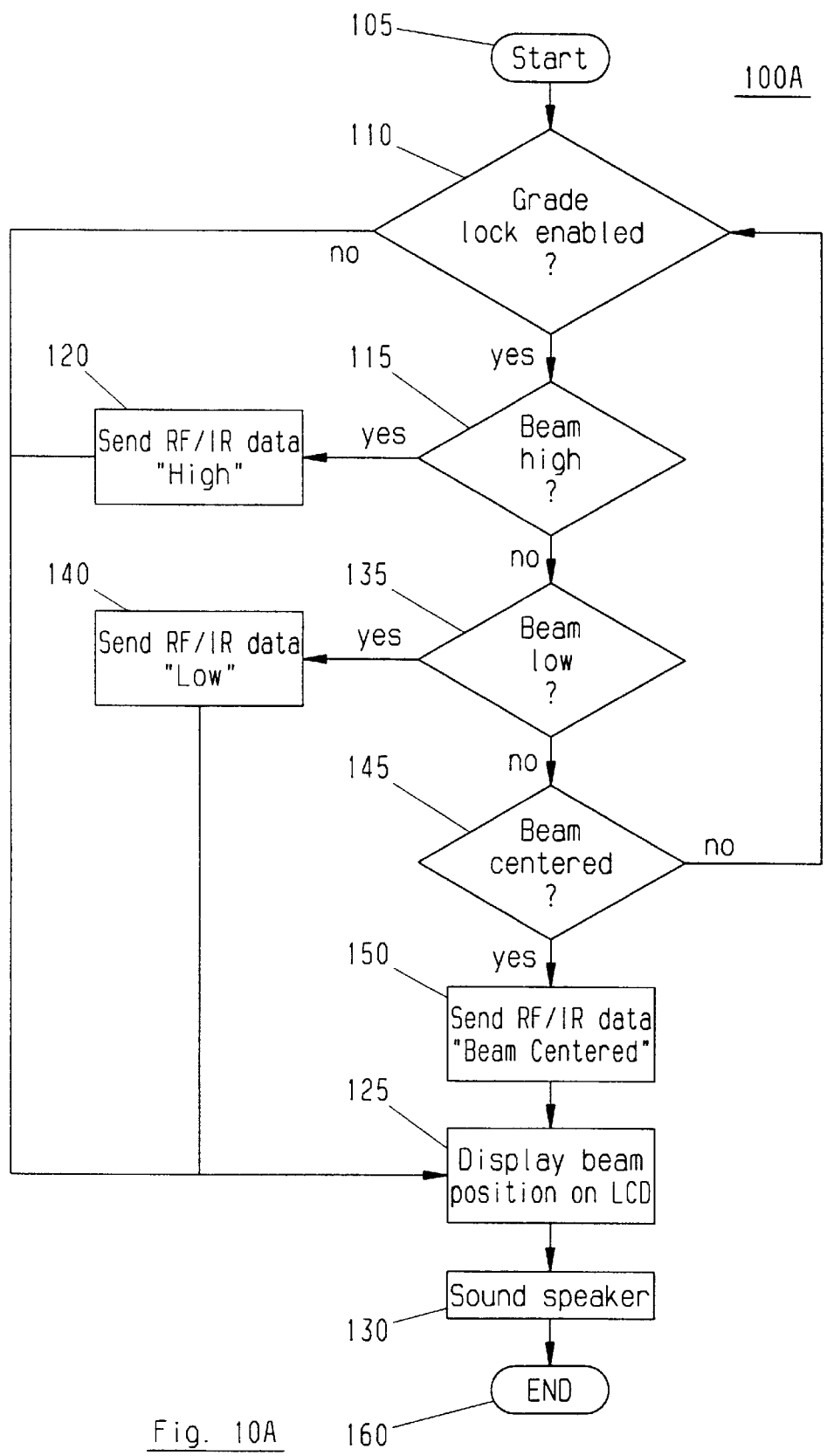
FIG. 10A is a drift adjustment process for the laser receiver.

Referring now to FIG. 10A, the drift adjust and/or slope matching process 100A for laser receiver 14 starts at 105. It is first determined at 110 whether the appropriate mode, such as a grade or slope lock function, has been enabled, such as by activating a "grade lock" or "slope lock" button 20a on laser receiver 14 (FIG. 2). If it is determined at 110 that the grade lock function is not enabled, then process 100A displays the beam position on display 21 at 125 and then activates audio device 58 at 130. Process 100A then ends at 160 and control 52 awaits a new input. If it is determined at 110 that the grade lock function is enabled, then it is further determined at 115 whether the laser beam is high or above center on the laser sensors 56. If it is determined at 115 that the beam is high, then laser receiver 14 is operable to communicate a "high" signal or data to laser transmitter 12 at 120. Process 100A then displays the beam position at LCD readout or display 21 at 125, activates audio device 58 at 130 and then ends at 160. If, on the other hand, the beam is not high at 115, then it is determined at 135 whether the beam is low. If the beam is determined to be low at 135, then laser receiver 14 communicates a "low" signal to laser transmitter 12 at 140. Process 100A then displays the beam position on display 21 at 125, activates audio device 58 at 130 and then ends at 160. If the beam is not low at 135, then it is determined at 145 whether the beam is centered on laser sensors 56. If the beam is centered at 145, then process 100A communicates a "beam centered" message or signal at 150. Process 100A then displays the beam position on display 21 at 125, activates audio device 58 at 130 and ends at 160. If it is determined at 145 that the beam is not centered, then process 100A returns to 110 to determine whether the grade lock function is still enabled and continues accordingly. Such a condition may arise when the laser receiver is not positioned in the path or plane of the laser beam. The laser receiver may then be re-positioned in the laser beam plane and the process 100A may continue.

Figure 10B:
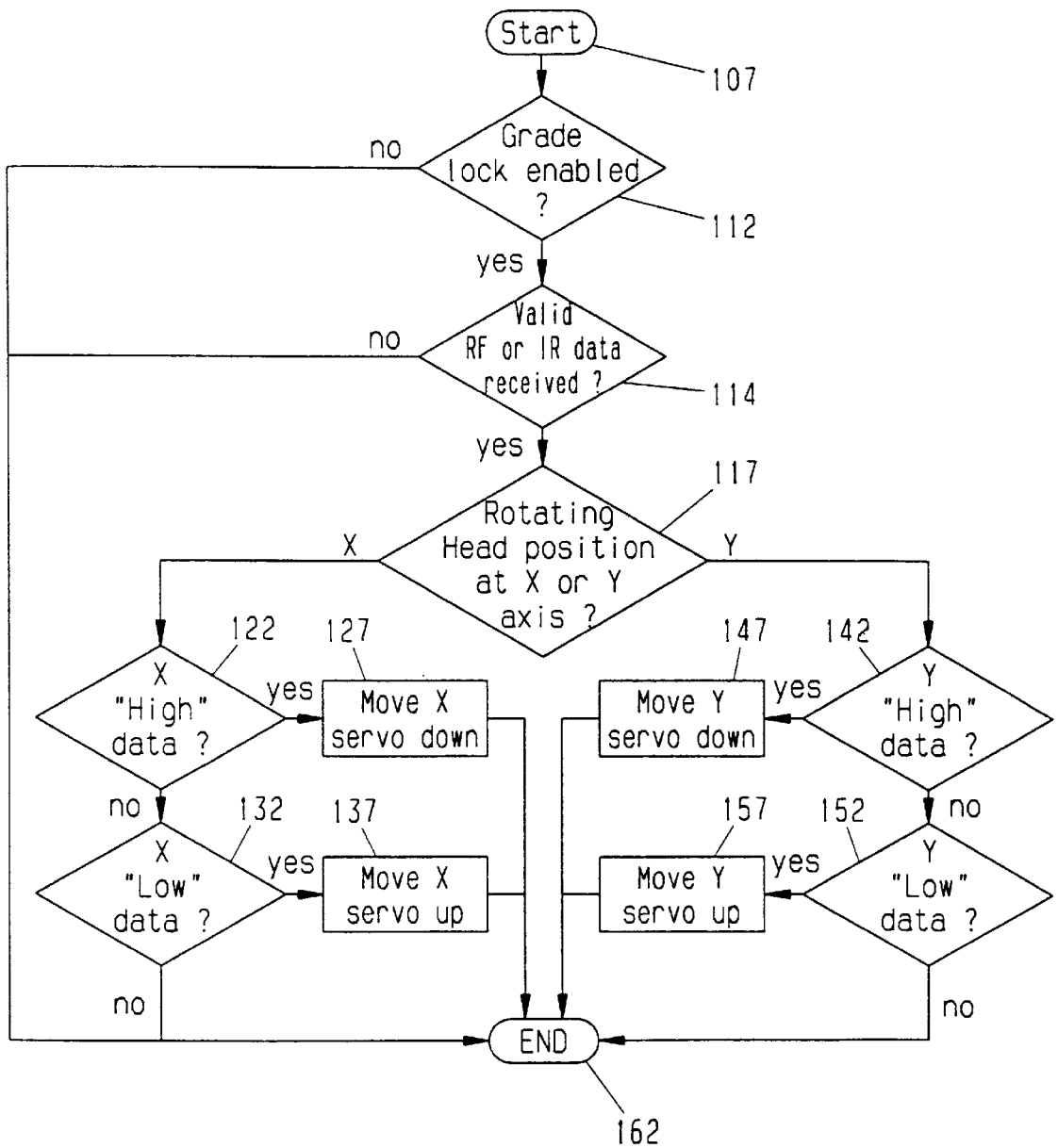
FIG. 10B is a drift adjustment process for the laser transmitter.

Referring now to FIG. 10B, the drift adjust and/or slope matching process 100B for laser transmitter 12 starts at 107. It is first determined at 112 whether a slope lock or grade lock function is enabled on laser transmitter 12, such as via a mode selection input, such as activation of one or more buttons 16 on control panel 18 of laser transmitter 12. If it is determined at 112 that the grade lock function is not enabled, then drift adjust process 100B ends at 162. If it is determined at 112 that the grade lock function is enabled, it is then determined at 114 whether a valid signal is received by laser transmitter 12 at 114. This is performed to ensure that the signal being received is from one of the appropriate laser receivers and is recognized or interpreted by control 19 as one of the high, low or centered signals. If it is determined at 114 that the signal received is not recognized or is otherwise invalid, process 100B ends at 162. If, on the other hand, it is determined at 114 that the signal received is one of the valid signals, then it is further determined at 117 whether the position of rotating head 20 is generally at the X or Y axis when the signal is received. This determines which axis the laser receiver that is sending the signal is generally positioned at or near. If the rotating head is positioned generally along the X axis, then it is determined at 122 whether the signal is communicating that the beam is high. If it is determined at 122 that the signal is a "high" signal, then control 19 activates X-axis motor 42a at 127 to lower the beam toward that particular laser receiver. Process 100B then ends at 162. If, on the other hand, it is determined at 122 that the X data received is not high, then it is further determined at 132 whether the signal received is communicating that the laser beam is low at the respective laser receiver. If the signal is not low at 132, then process 100B ends at 162, since this indicates that the beam is generally centered at the laser sensors 56 of laser receiver 14. However, if the signal is low at 132, then control 19 is operable to activate X-axis motor 42a at 137 to adjust the laser beam upwardly in the direction toward the laser receiver. Process 100B then ends at 162.

If it is determined at 117 that the laser receiver is positioned generally along the Y axis of laser transmitter 12, then it is determined at 142 whether the signal received conveys that the beam is high at the laser receiver. If the signal is a "high" signal, then control 19 is operable to activate Y-axis motor 42b at 147 to adjust the laser beam downwardly in the direction toward the laser receiver. Process 100B then ends at 162. If, on the other hand, the signal is not a "high" signal at 142, then it is determined at 152 whether the signal is a "low" signal. If it is determined at 152 that the signal is low, then control 19 is operable at 157 to activate Y-axis motor 42b to adjust the laser beam in an upwardly direction in the direction toward the laser receiver. Process 100B then ends at 162. If it is determined at 152 that the signal received is not a "low" signal, then the process 100B ends at 162, since this conveys that the laser beam is generally centered at the laser sensors 56 of laser receiver 14.

Accordingly, when the drift adjust or slope matching modes are selected at the laser transmitter 12 and/or laser receiver 14, the laser system is operable to adjust the laser plane upwardly or downwardly in the direction toward one of the laser receivers. This process is, therefore, operable to maintain the laser plane at a substantially constant position at a substantially fixed laser receiver. Additionally, laser receiver 14 may be raised or lowered to a desired new height or location, which results in the laser beam being adjusted upwardly or downwardly until the beam is centered at the new location. Accordingly, laser system 10 is operable to set a desired slope or grade even if the laser transmitter is a non-grade transmitter of the type discussed above with respect to FIGS. 5–7. Preferably, laser receiver 14 will be placed generally at the X and/or Y axes of laser transmitter 12, Such that raising or lowering the beam to align the beam with laser receiver 14 requires adjustment of only one of the X-axis or Y-axis servo motors. This avoids the additional difficulties associated with proper orientation of the laser plane if the plane adjusted to align with a laser receiver positioned between the X and Y axes. It is further envisioned that laser transmitter 12 may be oriented such that the laser plane being generated is substantially vertical. Laser system 10 may then be operable to adjust or tilt the laser plane horizontally to align the plane with a center region of the laser sensors at laser receiver 14. Laser receiver 14 may be substantially stationarily positioned or may be moved while the beam is being adjusted.

Laser system 10 is preferably further operable in a target detection mode, where laser receiver 14 is operable to communicate a strike signal or pulse to the laser transmitter when the laser beam is received or detected at the laser sensors 56 of laser receiver 14. Laser transmitter 12 is then operable to oscillate the laser beam about the strike point (or position of the laser receiver) in response to such a signal and mode selection. Alternately, the beam may be stopped at that point and held stationary. Once the laser beam of laser transmitter 12 is oscillating about the strike point, laser receiver 14 may be removed from that area, while laser transmitter 12 continues to oscillate or dither the beam at that point or region. This function is particularly useful for inside applications of the laser system 10, since narrowing the band of oscillation along a ceiling or wall results in greater visibility of the laser beam in that area, versus the intermittent swipe of the laser beam along the ceiling and/or wall as the beam is rotated 360° by the laser transmitter.

Figure 11A:
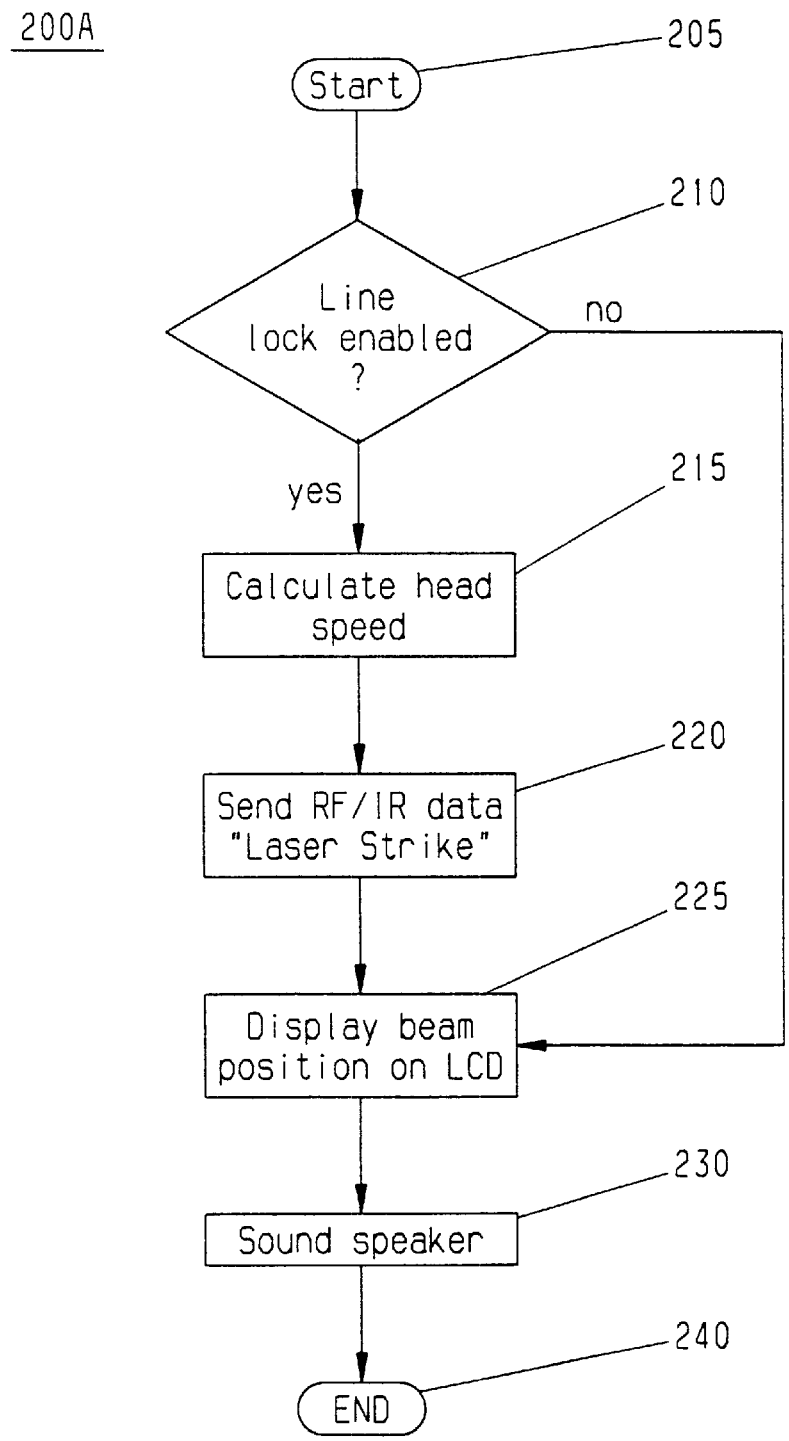
FIG. 11A is a target detection process for the laser receiver.

Referring now to FIG. 11A, a target detection process 200A for laser receiver 14 starts at 205. It is first determined at 210 whether the appropriate function is enabled, such as a line-lock function, which may be selected or enabled via activation of a "line-lock" button 20b on laser receiver 14. If the line-lock function is not enabled at 210, then process 200A displays the beam position on display 21 at 225, activates audio device 58 at 230 and ends at 240. If it is determined at 210 that the line lock function is enabled, then control 52 optionally may be operable to calculate the rotational speed of rotating head 20 at 215. This step may be performed if laser system 10 is operable to synchronize the RF transmission of laser receiver 14 with the laser beam from laser transmitter 12. Transceiver 54 of laser receiver 14 is then operable to communicate a signal to laser transmitter 12 at 220. The signal may be a "laser strike" signal, and may be the same signal as one or more of the signals conveyed during the beam or plane adjustment process 100A, discussed above. The beam position is then displayed on display 21 at 225. The audio device 58 may then be activated at 230. Process 200A then ends at 240.

Figure 11B:
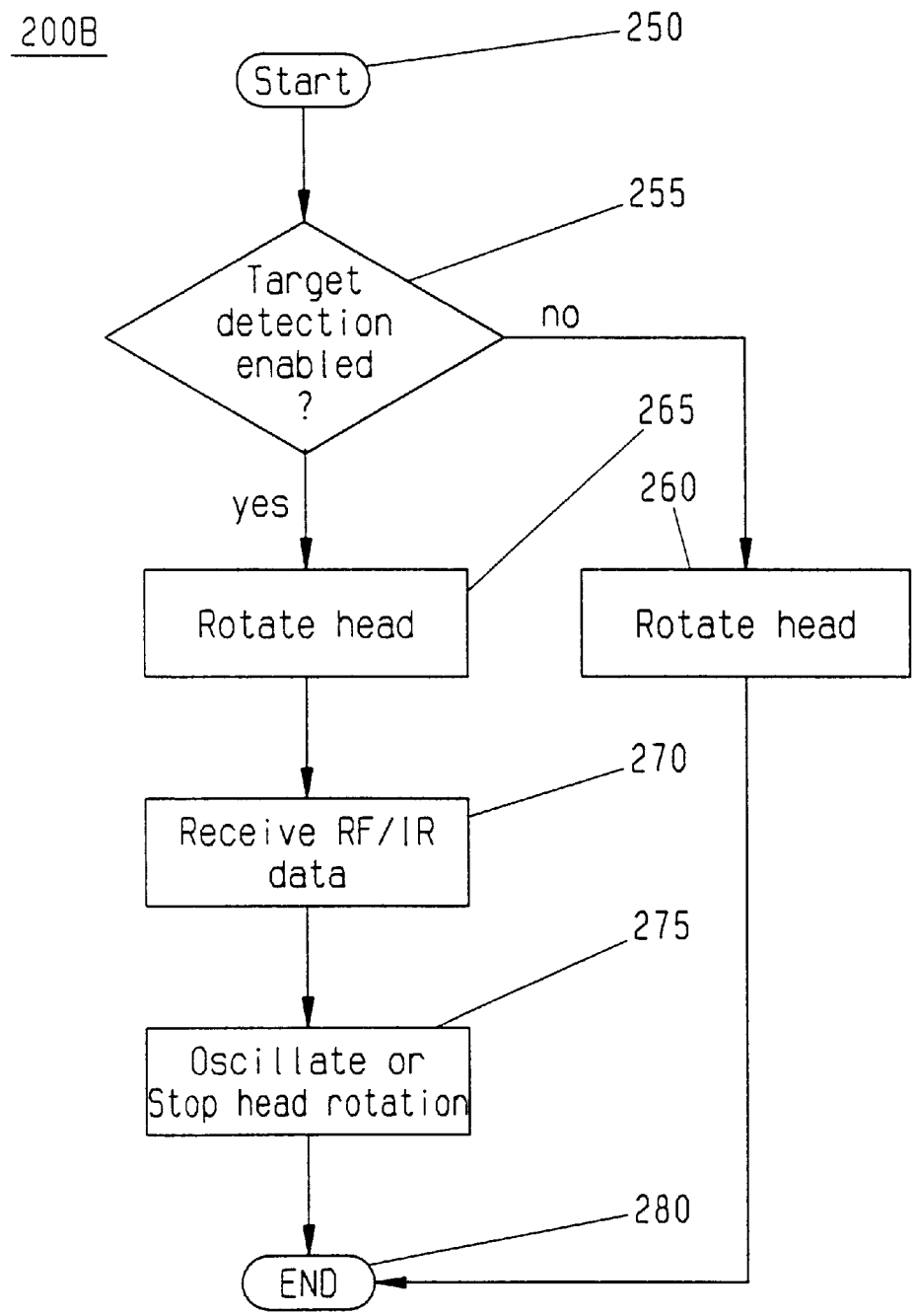
FIG. 11B is a target detection process for the laser transmitter.

Referring now to FIG. 11B, a target detection process 200B for laser transmitter 12 starts at 250. It is first determined at 255 whether the appropriate mode selection, such as a target detection mode, has been enabled at laser transmitter 12. The mode may be selected via any means, and preferably via actuation of one of the buttons 16 on control panel 18 of laser transmitter 12. If it is determined at 255 that the target detection mode has not been enabled, then process 200B functions to rotate rotating head 20 at 260, such that laser transmitter 12 continues to operate in a normal manner and generates a laser plane via 360° rotation of the rotating head. Process 200B then ends at 280. If it is determined at 255 that the target detection mode has been enabled, then process 200B is operable to continue rotating the head 20 of laser transmitter 12 at 265, until an appropriate signal is received from laser receiver 14. When laser receiver 14 transmits the laser strike or pulse signal at 220 of process 200A, laser transmitter 12 substantially simultaneously receives the signal or data at 270 of process 200B. Laser transmitter 12 is then operable to oscillate or rotate the laser beam back and forth over a predetermined angle, or to stop or maintain the beam at that position, at 275. Laser transmitter 12 will continue to oscillate or to maintain rotating head 20 at a fixed orientation until a second signal is received from laser receiver 14 and/or at control panel 18 of laser transmitter 12. For example, pressing the line-lock button 20b on laser receiver 14 a second time may cause laser transmitter 12 to continue rotation of rotating head 20 to resume generating a laser plane via 360° rotation of rotating head 20. Alternately, or additionally, full or 360 degree rotation of the rotating head 20 may resume via activation of one or more buttons 16 on control panel 18 of laser transmitter 12. Target detection process 200B then ends at 280.

Accordingly, laser system 10 is selectably operable to provide an oscillating or steady beam at a desired area or point, such as along an interior wall or ceiling. The system 10 may be selectively operable, such that a user selects the target detection mode and then further selects whether the beam is to be oscillated or held stationary at the targeted location. This provides improved visibility of the laser beam for interior applications where construction workers align new walls or ceilings with the visible laser beam. Because the area of oscillation is selected simply by holding the hand held laser receiver 14 at the appropriate area and activating the line-lock button 20b, improper positioning of the oscillating beam is substantially precluded. Additionally, activation of the oscillating beam is simplified over the prior art because the present invention facilitates activation of an oscillating beam by merely activating the hand held unit (laser receiver 14), rather than having to access and activate the laser transmitter, which may be positioned at a raised or elevated position and thus not easily accessible by a worker.

If laser transmitter 12 comprises a grade transmitter, such as described above with respect to FIGS. 8 and 9, laser system 10 may be further operable in a grade axis alignment mode. In such a mode, the desired percent grade in both the X and Y directions may be input into the laser transmitter. Laser receiver 14 may then be positioned at some point between the X and Y axes and be operable to transmit a signal to laser transmitter 12 when the laser beam is received or detected by sensor 56 of laser receiver 14. Control 19 of laser transmitter 12 is then operable to determine the angle between the X or Y axis and laser receiver 14. From that angle ($\omega_r$), an appropriate tilt angle of each axis ($\Theta_x$ and $\Theta_y$) may be calculated and the axes may be adjusted accordingly via the X and Y mechanisms 60 and 62 (FIG. 7) and the leveling mechanisms. The appropriate orientation of the desired grade is thus easily provided by positioning laser receiver 14 in a desired location. Accordingly, the grade alignment may be accomplished by a single worker and is operable to provide accurate orientation of the desired slope without the complicated laser transmitter assemblies of the prior art.

With respect to the grade axis alignment mode, laser receiver 14 is operable in the same manner as described above in target detection process 200A. Accordingly, a detailed discussion of that process will not be repeated herein. Laser receiver 14 is placed in a desired location where the desired plane will intercept sensor 56, and is operable to transmit a signal to laser transmitter 12 in response to detecting the laser beam at laser sensors 56 of laser receiver 14.

Figure 12:
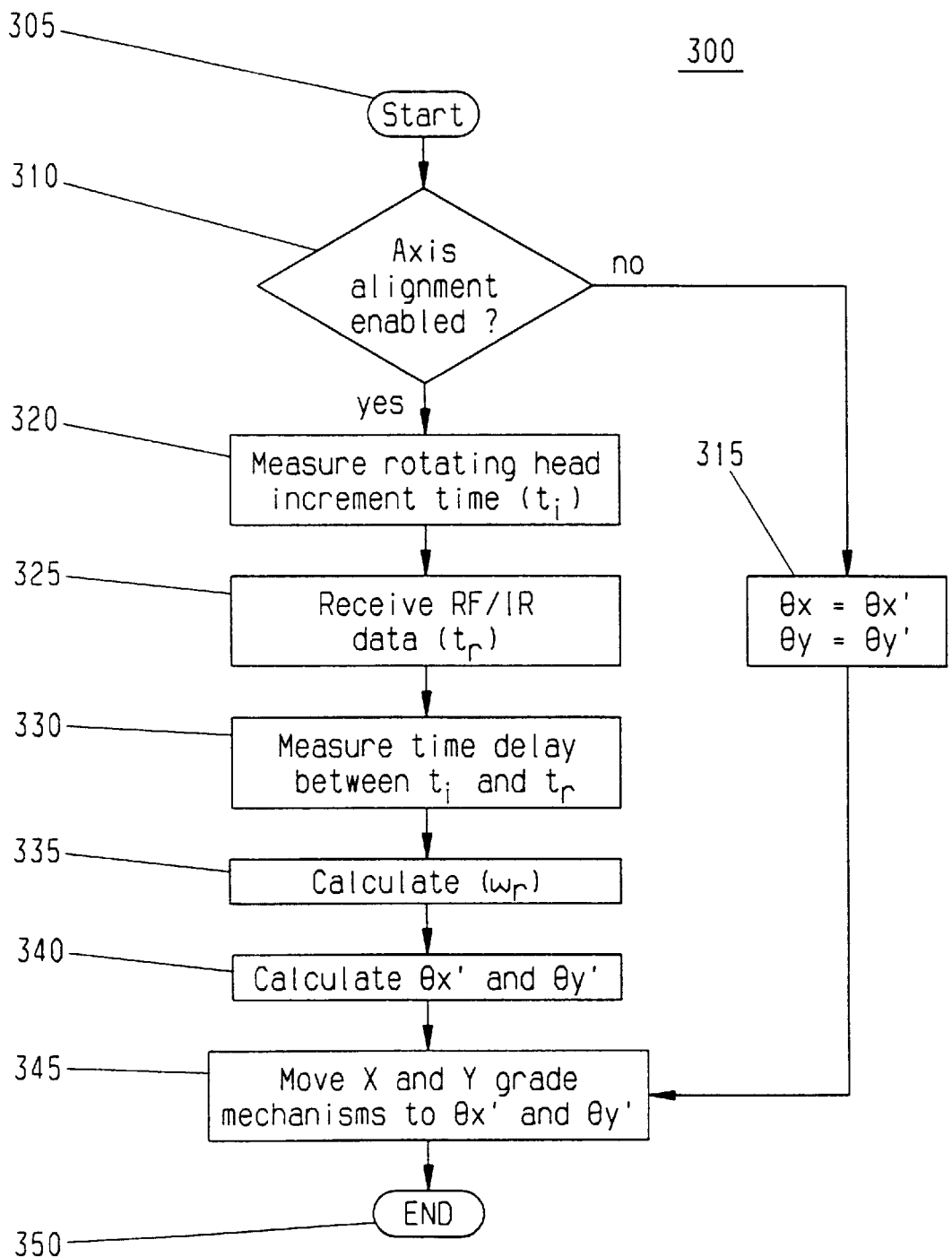
FIG. 12 is a grade axis alignment process for the laser transmitter.

Referring now to FIG. 12, a grade axis alignment process 300 for laser transmitter 12 starts at 305. It is first determined at 310 whether the axis alignment mode has been enabled on laser transmitter 12. Enabling the axis alignment mode may be accomplished via any known means, such as activation of a button or the like on the control panel 18 of laser transmitter 12. If it is determined at 310 that the axis alignment mode has not been enabled, then the input angles or slopes ($\Theta_x$ and $\Theta_y$) are set to be the targeted angles ($\Theta_{x'}$ and $\Theta_{y'}$) at 315. Laser transmitter 12 is then operable to adjust the X and Y grade mechanisms at 345 so the level sensors are oriented at the $\Theta_{x'}$ and $\Theta_{y'}$ angles. Process 300 then ends at 350. If it is determined at 310 that the axis alignment mode is enabled, then laser transmitter measures a rotating head increment time ($t_i$) at 320. The increment time is determined to be a time at which the position or orientation of the laser beam is known via the position sensor 28 detecting the mark or gap or tooth on encoder 26, preferably such as when the laser beam is directed along the X or Y axis. Transceiver 50 of laser transmitter 12 is then operable at 325 to receive the signal from laser receiver 14, which is transmitted by laser receiver 14 at step 220 of process 200A, discussed above. The signal is received by laser transmitter at a time ($t_r$) following the increment time $t_i$. The time $t_r$ is the time at which the laser is detected by laser receiver 14 and the corresponding signal is communicated to laser transmitter 12. Laser transmitter 12 is then operable to measure the time delay between $t_i$ and $t_r$ at 330, and then to calculate the angle ($\omega_r$) at 335, where the angle $\omega_r$ is the angle in which the laser beam sweeps or rotates between the initial increment time $t_i$ and the time $t_r$. Process 300 then proceeds to calculate the appropriate angles $\Theta_{x'}$ and $\Theta_{y'}$ at 340, in order to orient the level sensors at the desired slope or grade, such that the new targeted plane intersects laser receiver 14. Control 19 of laser transmitter 12 then actuates the X and Y grade mechanisms 60 and 62 to adjust the angles of the level sensors to the targeted angles $\Theta_{x'}$ and $\Theta_{y'}$ at 345. Process 300 then ends at 350.

Accordingly, the grade or slope of a laser plane may be easily oriented with respect to the laser receiver. Because the laser transmitter adjusts the X and Y axes in response to the location of the laser receiver and a % grade input for both axes, the proper orientation is achieved without requiring the complicated inner-mechanisms and orientation problems of many of the prior art grade laser transmitters. Control 19 of laser transmitter 12 is operable to calculate the appropriate angles $\Theta_{x'}$ and $\Theta_{y'}$ via known mathematical equations, once the percent grade in the X and Y directions is known and the location of the laser receiver in the targeted plane relative to the axes is determined.

Accordingly, laser system 10 is selectively operable in various modes in response to a user input and one or more signals from the laser receiver. The laser transmitter adjusts the tilt of the laser beam along either or both the X and Y axes in response to the laser receiver, and/or may oscillate the beam or maintain the beam in a stationary position in response to a different mode selection or user input. The laser receiver may be operable to transmit an appropriate signal in response to activation of one of two buttons 20a and 20b, while the laser transmitter may be operable in response to a mode selection of one of the four modes at the laser transmitter and further in response to the signal received from the laser receiver.

Figure 13A:
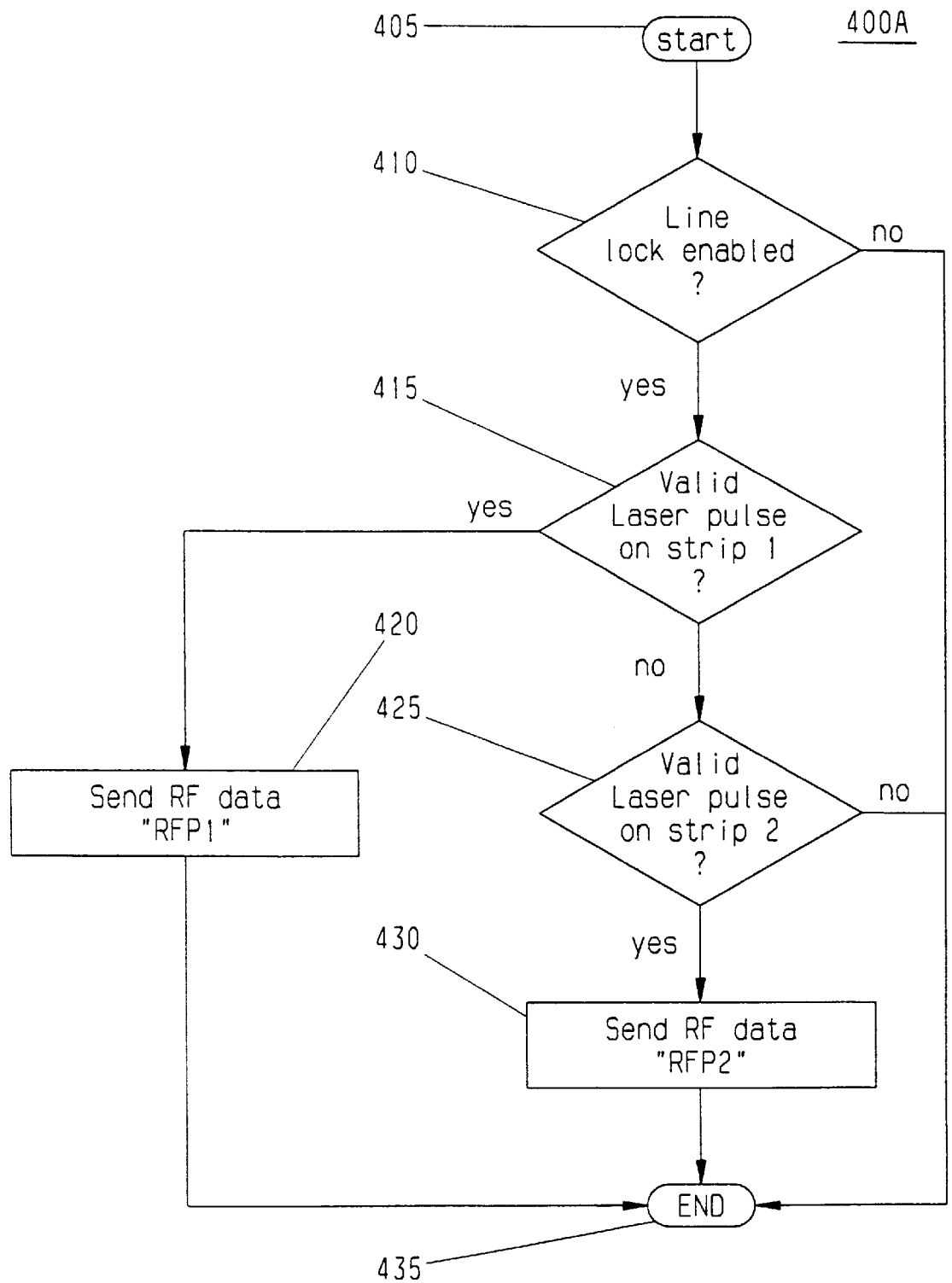
FIG. 13A is a target detection process useful with a laser receiver useful with a pipe laser transmitter.
Figure 13B:
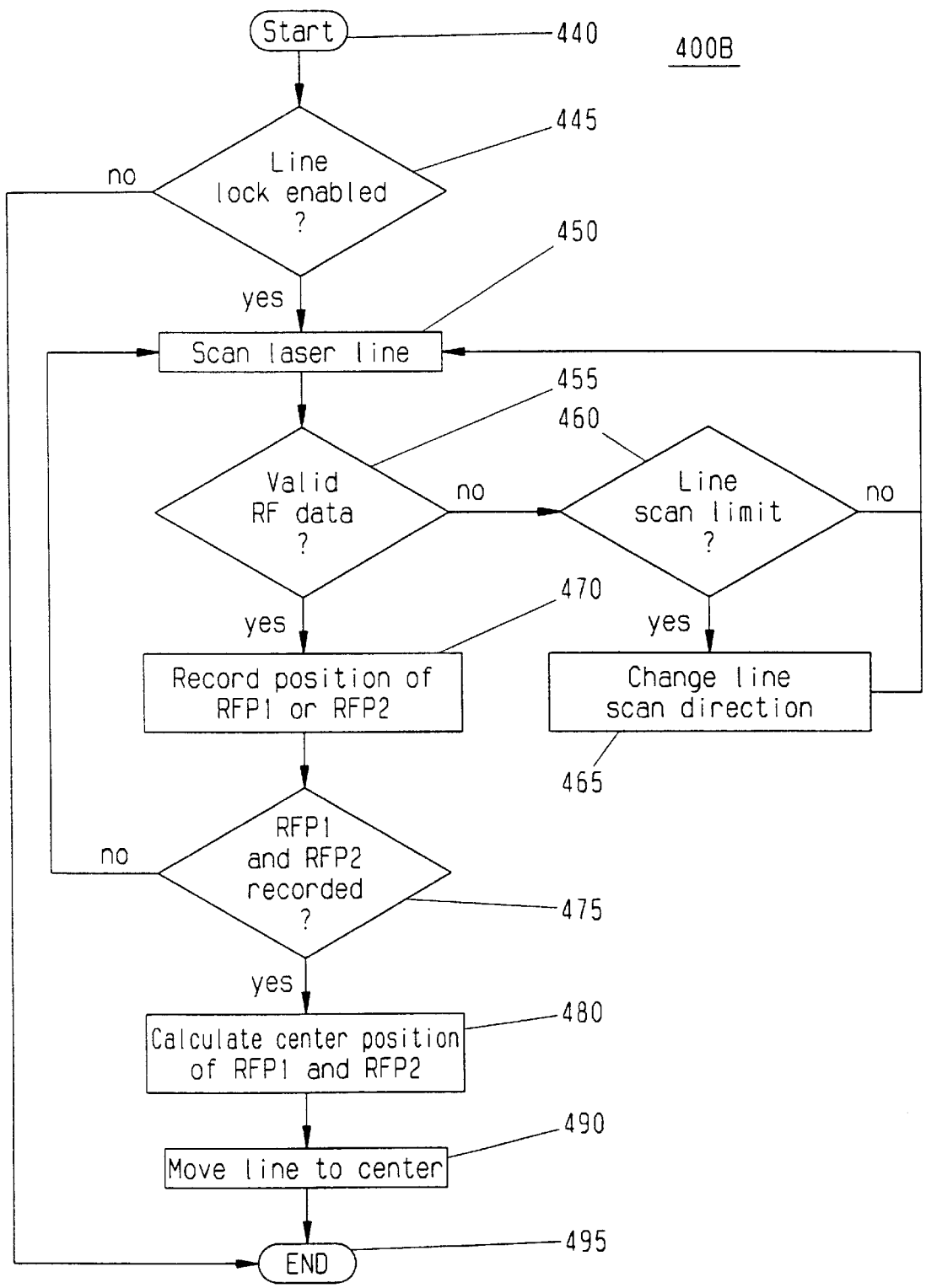
FIG. 13B is a target detection process for the pipe laser transmitter.

Referring now to FIGS. 13A and 13B, it is further envisioned that aspects of the present invention may be implemented in a target detection mode for a pipe laser (not shown). The pipe laser transmitter may be operable to automatically position a stationary laser beam, such as a beam emitted from a pipe or tunnel laser, onto the center of a receiver or target (not shown). The target may incorporate at least one strip of photo sensitive laser receiving material or a laser sensor and a transmitter or transceiver, similar to laser receivers 14. The transceiver is operable to provide information back to the pipe laser transmitter, which also comprises a receiver or transceiver to communicate therewith. Preferably, the transceivers are operable to transmit and receive an RF signal, similar to the signals discussed above with respect to laser transmitter 12 and laser receiver 14. The laser transmitter is then operable to scan the laser beam in a horizontal direction until the target laser receiver detects the presence of the laser beam at the laser sensors. The laser receiver is then operable to generate a first signal, such as a first RF pulse train (RFP1). The laser transmitter then continues to scan until the laser passes through the second strip of laser sensors. At this time, the laser receiver is operable to generate a second signal or RF pulse train (RFP2). The RF pulses RFP1 and RFP2 are different in that they indicate the direction toward the center of the target. The laser transmitter is then operable to measure the angle between RFP1 and RFP2 and automatically position the beam halfway between the two laser sensors.

Referring now to FIG. 13A, a target detection process 400A for the laser receiver starts at 405. It is first determined at 410 whether a line-lock function is enabled on the laser receiver. If the line-lock function is not enabled at 410, then process 400A ends at 435. If it is determined that the line-lock function is enabled at 410, it is then determined at 415 whether a valid laser pulse has been received at the first sensor. If it is determined at 415 that a valid laser pulse has been received on the first sensor, then process 400A communicates an "RFP1" signal to the laser transmitter at 420 and ends at 435. If it is determined at 415 that a valid pulse is not received on the first sensor, then it is further determined if the valid laser pulse has been received on the second sensor at 425. If it is determined at 425 that a valid laser pulse has not been received on the second sensor, then the process 400A ends at 435. If, on the other hand, it is determined at 425 that a valid laser pulse has been received on the second sensor, then process 400A is operable to communicate a second "RFP2" signal to the laser transmitter at 430. Process 400A then ends at 435. The process is repeated until both the RFP1 and RFP2 signals have been sent by the laser receiver.

Referring now to FIG. 13B, a target detection process 400B for the pipe laser transmitter starts at 440. It is first determined at 445 whether a line-lock mode or function is enabled. If it is determined at 445 that the line-lock mode or function is not enabled, then process 400B ends at 495. If it is determined at 445 that the line-lock function is enabled, then the laser transmitter scans a laser line at 450. It is then determined at 455 whether a valid signal has been received from the laser receiver or target. If a valid signal has not been received at 455, then it is determined at 460 whether the laser transmitter has reached a limit to the scanning range. If the limit has not been reached at 460, then the laser continues to scan the laser line at 450. If the limit has been reached at 460, then process 400B is operable to change the line scan direction at 465 and continue to scan the laser line in an opposite direction at 450. If it is determined at 455 that a valid signal (RFP1 or RFP2) has been received from the laser receiver, then the laser position is recorded for the RFP1 or RFP2 signal at 470. It is then determined at 475 whether both the RFP1 and RFP2 signals have been recorded. If both have not been recorded at 475, then the laser continues to scan the laser line at 450. If it is determined at 475 that both RFP1 and RFP2 signals have been recorded, then the laser transmitter calculates the center position of the RFP1 and RFP2 positions at 480. The laser transmitter is then operable to move the laser line to the center between the RFP1 and RFP2 positions at 490. Process 400B then ends at 495.

Accordingly, the laser system of the present invention is applicable to various laser applications and provides various modes or functions in response to simple user input at either or both of the laser receivers and the laser transmitters. The present invention further provides for grade or plane or slope adjustments for low cost leveling only laser transmitters, thereby providing significant cost savings to a user of the laser system. Additionally, the system provides for easy set up and use of the system in each of the various modes, such that the laser system may be set up and implemented with a minimal amount of labor and a minimal number of workers.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A laser system comprising:
   a laser transmitter which is operable to generate a laser plane, said laser transmitter comprising a signal receiver and a transmitter control; and
   a laser receiver comprising at least one laser sensor which is operable to detect a laser beam from said laser transmitter, said laser receiver comprising an electrical signal transmitter and a receiver control, said laser receiver being selectably operable to transmit at least one electrical signal to said laser transmitter in response to said laser sensor detecting the laser beam from said laser transmitter, said laser transmitter being selectably operable to adjust the laser beam in response to the at least one electrical signal transmitted by said laser receiver.

2. The laser system of claim 1, wherein the at least one electrical signal comprises a radio frequency signal.

3. The laser system of claim 1, wherein said laser system is selectably operable in a plane adjust mode, where said laser system is operable to adjust an orientation of the laser beam with respect to said laser receiver, in response to said laser receiver and a user input.

4. The laser system of claim 3, wherein said laser sensor comprises at least two regions, said laser receiver is selectably operable to transmit a first signal in response to the laser beam being received at a first region of said laser sensor and a second signal in response to the laser beam being received at a second region of said laser sensor, said laser transmitter being operable to adjust the laser plane in response to at least one of said first and second signals.

5. The laser system of claim 4, wherein said first region is a center region of said laser sensor and said second region is at least one of an upper and lower region of said laser sensor, said laser transmitter being operable to adjust the laser plane in response to said second signal.

6. The laser system of claim 4, wherein said laser receiver is further operable to transmit a third signal in response to the laser beam being received at a third region of said laser sensor.

7. The laser system of claim 6, wherein said first region is a center region of said laser sensor, said second region is an upper region of said laser sensor, and said third region is a lower region of said laser sensor, said laser transmitter being operable to adjust the laser plane upwardly in response to said third signal and to adjust the laser plane downwardly in response to said second signal.

8. The laser system of claim 1, wherein said laser system is selectably operable in a target detection mode.

9. The laser system of claim 8, wherein said laser transmitter is selectably operable to one of hold the laser beam and oscillate the laser beam through an angle in response to a first signal from said laser receiver, the angle of oscillation being associated with an initial position of said laser receiver when said laser receiver transmits the first signal.

10. The laser system of claim 9, wherein said laser transmitter is operable to continue 360 degree rotation in response to a second signal from said laser receiver.

11. The laser system of claim 9, wherein said laser receiver is operable to transmit the first signal in response to a user input to said laser receiver.

12. The laser system of claim 9, wherein said laser receiver is removable from the initial position after said laser receiver transmits the first signal.

13. The laser system of claim 1, wherein said laser transmitter comprises a grade laser transmitter, said grade laser transmitter being operable to adjust the laser plane about at least two distinct axes.

14. The laser system of claim 13, wherein said laser system is selectably operable in a grade axis alignment mode in response to a user input.

15. The laser system of claim 14, wherein said transmitter control is operable to receive a grade input from a user, said laser transmitter being further operable to orient a laser plane corresponding to the grade input in response to said laser receiver and said transmitter control.

16. The laser system of claim 15, wherein said transmitter control is operable to calculate a position of said laser receiver in response to a time delay between an initial laser beam position and the signal from said laser receiver, the signal being transmitted to said laser transmitter in response to said laser sensors detecting the laser beam.

17. The laser system of claim 16, wherein said transmitter control is operable to calculate the orientation of the plane corresponding to the grade input in response to the position of said laser receiver and the grade input, said laser transmitter being further operable to adjust the plane in response to the orientation calculation.

18. The laser system of claim 17, wherein said at least two distinct axes comprise a first axis and a second axis, said transmitter control being operable to calculate a first axis orientation and a second axis orientation of the laser plane corresponding to the grade input and being further operable to adjust said first axis and said second axis of the laser plane in response to the orientation calculation.

19. The laser system of claim 1, wherein said laser system is selectably operable in at least one of a plane adjustment mode, a target detection mode, a slope matching mode and a grade axis alignment mode.

20. The laser system of claim 19, wherein said laser transmitter is operable to adjust the laser plane about at least two distinct axes, said laser transmitter comprising a first axis leveling, mechanism and a second axis leveling mechanism.

21. The laser system of claim 20, wherein said first axis and second axis leveling mechanisms comprise electrical servo motors.

22. The laser system of claim 1, wherein said laser system is selectably operable in a plane adjustment mode, a target detection mode, a slope matching mode and a grade axis alignment mode.

23. The laser system of claim 1, wherein said laser transmitter is operable to generate the laser plane via rotational projection of the laser beam.

24. A laser system comprising:
a laser transmitter which is operable to generate a laser plane, said laser transmitter comprising a signal receiver and a transmitter control; and
a laser receiver comprising at least one laser sensor comprising a plurality of sensing regions, each of said sensing regions being operable to detect a laser beam from said laser transmitter, said laser receiver comprising an electrical signal transmitter and a receiver control, said laser receiver being operable to transmit a first electrical signal to said laser transmitter in response to said laser sensor detecting the laser beam at a first region of said laser sensor, said laser receiver being further operable to transmit a second electrical signal in response to said laser sensor detecting the laser beam at a second region of said laser sensor, said laser receiver being further operable to transmit a third electrical signal in response to said laser sensor detecting the laser beam at a third region of said laser sensor, said laser transmitter being operable to adjust the laser beam in response to at least one of the first, second and third electrical signals.

25. The laser system of claim 24, wherein said first region is a center region of said laser sensor and said second and third regions are opposite one another from said center region, said laser transmitter being operable to adjust the laser beam in response to the second and third electrical signals.

26. The laser system of claim 24, wherein said laser receiver is stationary mounted at a position relative to said laser transmitter, said laser system being operable to adjust a misalignment of the laser beam with respect to at least one of said first, second and third regions of said laser sensor.

27. The laser system of claim 24, wherein said laser receiver is movably mounted at a first position relative to said laser transmitter, said laser system being operable to adjust the laser beam in response to a movement of said laser receiver toward a second position relative to said laser transmitter.

28. The laser system of claim 24, wherein said laser system is further selectably operable in at least one of a grade axis alignment mode and a target detection mode.

29. The laser system of claim 24, wherein said laser transmitter is operable to generate the laser plane via rotational projection of the laser beam.

30. A laser system comprising:
a laser transmitter which is operable to generate a laser plane, said laser transmitter comprising a signal receiver and a transmitter control; and a laser receiver comprising at least one laser sensor which is operable to detect a laser beam from said laser transmitter, a signal transmitter and a receiver control, said signal transmitter being operable to transmit an electrical signal to said laser transmitter in response to said laser sensor detecting the laser beam, said laser transmitter being operable to one of holding the laser beam at a hold point and oscillating the laser beam within an angle range, the hold point or angle range being a function of an initial location of said laser receiver when detecting the laser beam from said laser transmitter.

31. The laser system of claim 30, wherein said laser receiver is movable from the initial location after transmitting the electrical signal, said laser transmitter being operable to continue holding or oscillating the laser beam after said laser receiver has been moved.

32. The laser system of claim 30, wherein said laser receiver is operable to selectively transmit a second electrical signal, said laser transmitter being operable to generate the laser plane via 360 degree rotational projection of the laser beam in response to the second electrical signal.

33. The laser system of claim 30, wherein said laser system is selectably operable in a slope matching mode, a beam adjust mode and a,grade axis alignment mode.

34. The laser system of claim 30, wherein said laser transmitter is operable to generate the laser plane via rotational projection of the laser beam.

35. A laser system comprising:

a laser transmitter which is operable to generate a laser plane, the laser plane being adjustable about at least two distinct axes of said laser transmitter to generate a sloped plane at a grade angle with respect to an earth reference in response to a selected grade input, said laser transmitter comprising a signal receiver and a transmitter control; and a laser receiver comprising at least one laser sensor which is operable to detect a laser beam from said laser transmitter, said laser receiver comprising a signal transmitter and a receiver control, said laser receiver being operable to transmit an electrical signal to said laser transmitter in response to said laser sensor detecting the laser beam, said transmitter control being operable to calculate an appropriate orientation of the sloped plane in response to said laser receiver and adjust the laser plane about said at least two distinct axes to generate the sloped plane at the calculated orientation.

36. The laser system of claim 35, wherein said transmitter control is operable to calculate a position of said laser receiver via a time delay between the laser beam being projected in a known direction and being projected at said laser receiver.

37. The laser system of claim 35, wherein said laser transmitter is operable to generate the laser plane via a rotating laser beam.

38. The laser system of claim 37, wherein said laser transmitter further comprises a pick off device which is operable to monitor a rotational orientation of the rotating laser beam.

39. The laser system of claim 38, wherein said pick off device comprises a rotatable disc having at least one notch or tooth thereon and a sensor which is operable to detect said at least one notch or tooth.

40. The laser system of claim 38, wherein said transmitter control is operable to calculate a position of said laser receiver via an output of said pick off device.

41. The laser system of claim 35, wherein said at least two distinct axes comprise a first and second axis which are mutually perpendicular to one another.

42. The laser system of claim 41, wherein said transmitter control is further operable to calculate a first tilt angle for said first axis and a second tilt angle for said second axis in response to the selected grade input and the position of said laser receiver.

43. The laser system of claim 35, wherein said laser system is selectably operable in a slope matching mode, a beam adjust mode and a target detection mode.

44. A method of aligning and orienting a sloped plane of a laser transmitter comprising the steps of:

providing a laser transmitter which is operable to generate a laser plane, the laser plane being adjustable about at least two distinct axes of said laser transmitter to generate a sloped plane at a grade angle with respect to an earth reference in response to a selected grade input;

providing a laser receiver which is operable to detect a laser beam from said laser transmitter and to transmit a signal to said laser transmitter in response to said laser sensor detecting the laser beam;

providing a grade input to said laser transmitter;

placing said laser receiver at a target position such that the sloped plane will intersect said laser receiver;

transmitting a signal to said laser transmitter in response to said laser receiver detecting the laser plane;

determining an orientation of said laser receiver relative to said laser transmitter;

calculating the grade angle for each of the at least two distinct axes as a function of the grade input and the orientation of said laser receiver; and adjusting the laser plane in response to the calculated grade angle.

45. The laser system of claim 44, wherein said at least two distinct axes comprise a first axis and a second axis which are mutually perpendicular to one another.

46. The laser system of claim 45, wherein said transmitter control is further operable to calculate a first grade angle for said first axis and a second grade angle for said second axis as a function of the grade input and the orientation of said laser receiver relative to said laser transmitter.

47. The method of claim 44, wherein the orientation of said laser receiver relative to said laser transmitter is determined via rotational movement of the laser beam.

48. The method of claim 47, wherein said laser transmitter comprises a pick off device, the rotational movement of the laser beam being monitored by said pick off device.

* * * * *